(12) United States Patent
Kim

(10) Patent No.: US 12,344,074 B2
(45) Date of Patent: Jul. 1, 2025

(54) HEATING, VENTILATION, AND AIR-CONDITIONING DEVICE FOR A VEHICLE

(71) Applicants: HYUNDAI MOTOR COMPANY, Seoul (KR); KIA CORPORATION, Seoul (KR)

(72) Inventor: Ki Mok Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 361 days.

(21) Appl. No.: 17/860,739

(22) Filed: Jul. 8, 2022

(65) Prior Publication Data
US 2023/0057954 A1    Feb. 23, 2023

(30) Foreign Application Priority Data
Aug. 17, 2021 (KR) .......................... 10-2021-0108252

(51) Int. Cl.
*B60H 1/00* (2006.01)
*B60H 1/32* (2006.01)
*B60S 1/02* (2006.01)

(52) U.S. Cl.
CPC ....... *B60H 1/00785* (2013.01); *B60H 1/0075* (2013.01); *B60H 1/00764* (2013.01); *B60H 1/3207* (2013.01); *B60S 1/023* (2013.01)

(58) Field of Classification Search
CPC .............. B60H 1/00785; B60H 1/0075; B60H 1/00764; B60H 1/3207
See application file for complete search history.

(56) References Cited

U.S. PATENT DOCUMENTS

| | | | | |
|---|---|---|---|---|
| 5,971,845 A | * | 10/1999 | Echigoya ........... | B60H 1/00985 454/75 |
| 2008/0168785 A1 | * | 7/2008 | Sauer ................. | B60H 1/00785 62/176.6 |
| 2018/0134118 A1 | * | 5/2018 | Hintea ............... | B60H 1/00742 |

FOREIGN PATENT DOCUMENTS

KR    980007716 U    4/1998

* cited by examiner

*Primary Examiner* — Jonathan Bradford
(74) *Attorney, Agent, or Firm* — Lempia Summerfield Katz LLC

(57) ABSTRACT

A heating, ventilation, and air-conditioning device includes: a heating part disposed in a windshield glass of a vehicle and configured to heat the windshield glass; a collection part configured to collect state information on a state of the windshield glass and environment information on internal and external environments of the vehicle; and a control part. The control part is configured to determine a defrosting or dehumidifying mode for the windshield glass based on the state information or the environment information collected by the collection part and to control an operation of the heating part depending on the determined defrosting or dehumidifying mode.

7 Claims, 3 Drawing Sheets

HEATING, VENTILATION, AND AIR-CONDITIONING DEVICE FOR A VEHICLE

CROSS REFERENCE TO RELATED APPLICATION

The present application claims priority to Korean Patent Application No. 10-2021-0108252, filed Aug. 17, 2021, the entire contents of which are incorporated herein for all purposes by this reference.

BACKGROUND

Field of the Disclosure

The present disclosure relates to a heating, ventilation, and air-conditioning device for a vehicle. The device is configured to heat a windshield glass of a vehicle by determining a defrosting or dehumidifying mode when frost or moisture forms on the windshield glass.

Description of the Related Art

When frost or moisture forms on a windshield glass of a vehicle in the related art, either a user directly removes the frost, a heating wire embedded in the windshield glass removes the frost, or hot air is applied to the windshield glass to remove the frost. Likewise, the method mentioned above is also used to remove moisture when the moisture forms on the windshield glass due to a difference in temperature between the interior and the exterior of the vehicle.

The method of removing frost or moisture from the windshield glass using the heating wire may quickly remove the frost or the moisture. However, the embedded heating wire operates at the highest temperature, even in the case of removing moisture instead of frost, which causes a problem of excessive energy consumption.

Therefore, there is a need to develop a heating, ventilation, and air-conditioning device for a vehicle, which is capable of determining a dehumidifying mode and a defrosting mode in consideration of a state of a windshield glass of a vehicle and interior and exterior situations of the vehicle and which is capable of managing the windshield glass and efficiently using energy depending on the dehumidifying or defrosting mode.

The above-mentioned matters described as the background art are provided merely to aid understanding of the background of the present disclosure. The above-mentioned matters should not be construed to admit that the matters correspond to the technologies already known to those having ordinary skill in the art.

SUMMARY

The present disclosure is proposed to solve these problems and aims to provide a heating, ventilation, and air-conditioning device for a vehicle. When frost or moisture forms on a windshield glass of a vehicle, a control unit of the device recognizes internal and external environments of the windshield glass of the vehicle, determines a defrosting or dehumidifying mode for the windshield glass based on the recognition result, and controls a heating part depending on the determined defrosting or dehumidifying mode to heat the windshield glass.

To achieve the objects, a heating, ventilation, and air-conditioning device for a vehicle according to the present disclosure includes: a heating part disposed in a windshield glass of a vehicle and configured to heat the windshield glass; a collection part configured to collect state information on a state of the windshield glass or environment information on internal and external environments of the vehicle; and a control part. The control part is configured to determine a defrosting or dehumidifying mode for the windshield glass based on the state information or the environment information collected by the collection part and to control an operation of the heating part depending on the determined defrosting or dehumidifying mode.

The heating, ventilation, and air-conditioning device may further include a cooling/heating unit configured to cool and heat an interior of the vehicle or the windshield glass. Additionally, the control part may control the operation of the heating part and the operation of the cooling/heating unit depending on the determined defrosting or dehumidifying mode.

The state information may include a temperature or transparency of the windshield glass. The environment information may include temperatures or relative humidity inside and outside the vehicle, a vehicle speed, or the amount of solar radiation. The collection part may collect the state information or the environment information using a sensor unit, which may include a temperature sensor, a humidity sensor, a laser sensor, or a camera sensor.

When the control part receives a manual heating operation for the windshield glass from a user, the control part may determine whether frost or moisture has formed on the windshield glass. This is determined depending on the outside temperature of the vehicle or the vehicle speed. Further, the control part may additionally determine the defrosting or dehumidifying mode based on the result of determining whether frost or moisture has formed on the windshield glass.

When the control part receives the manual heating operation, the control part may determine that frost forms on the windshield glass when the outside temperature of the vehicle is lower than a predetermined temperature and the vehicle speed is 0 km/hr after the vehicle is started. The control part may also determine the defrosting mode for removing frost.

When the control part receives the manual heating operation, the control part may determine that moisture forms on the windshield glass when the outside temperature of the vehicle is equal to or higher than the predetermined temperature or when the vehicle speed has exceeded 0 km/hr (i.e., the vehicle is moving) after the vehicle is started. The control part may also determine the dehumidifying mode for removing moisture.

When the control part receives the manual heating operation for the windshield glass, the control part may operate the heating part at a maximum temperature for a predetermined time when the defrosting mode for removing frost from the windshield glass is determined. The control part may also operate the heating part, when the dehumidifying mode for removing moisture from the windshield glass is determined, until a temperature of the windshield glass reaches a predetermined temperature.

When an automatic heating operation is performed on the windshield glass while the vehicle travels, the control part may determine whether frost or moisture forms on the windshield glass by comparing relative humidity in the vehicle with reference humidity or by comparing a temperature of the windshield glass with a dew point temperature. The control part may also determine the defrosting or dehumidifying mode based on the result of determining whether the frost or moisture forms on the windshield glass.

The reference humidity may be humidity at which moisture forms on the windshield glass of the vehicle. The reference humidity may be determined based on the outside temperature of the vehicle, the vehicle speed, the amount of solar radiation, or an inside/outside air mode of the vehicle.

When the automatic heating operation is performed on the windshield glass, the control part may operate the heating part until the relative humidity in the vehicle becomes equal to or lower than the reference humidity when the dehumidifying mode for removing moisture from the windshield glass is determined.

When the automatic heating operation is performed on the windshield glass, the control part may operate the heating part until the temperature of the windshield glass becomes higher, by a predetermined numerical value or more, than the dew point temperature when the dehumidifying mode for removing moisture from the windshield glass is determined.

According to the heating, ventilation, and air-conditioning device for a vehicle according to the present disclosure, when frost or moisture forms on a windshield glass of a vehicle, the control unit may recognize internal and external environments of the windshield glass or the vehicle. Additionally, the control unit may determine the defrosting or dehumidifying mode for the windshield glass based on the recognition result and may control the heating part depending on the determined defrosting or dehumidifying mode to heat the windshield glass.

BRIEF DESCRIPTION OF THE DRAWINGS

The above and other objectives, features, and other advantages of the present disclosure should be more clearly understood from the following detailed description when taken in conjunction with the accompanying drawings.

DETAILED DESCRIPTION

Figure 1:
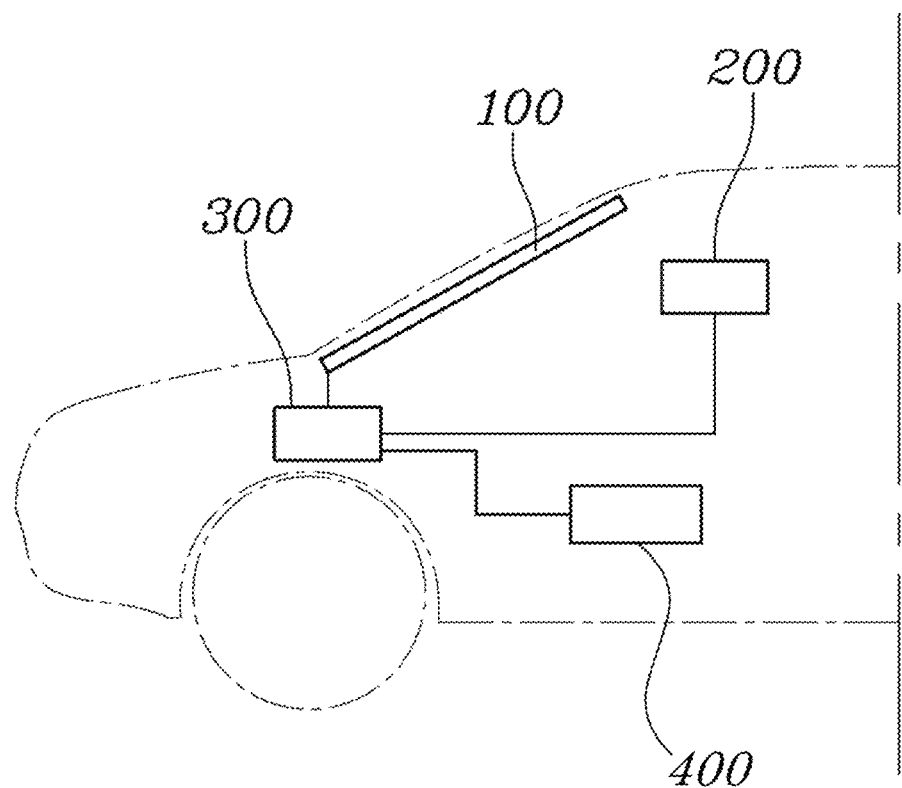
FIG. 1 is a view schematically illustrating a heating, ventilation, and air-conditioning device for a vehicle according to an embodiment of the present disclosure.
Figure 2:
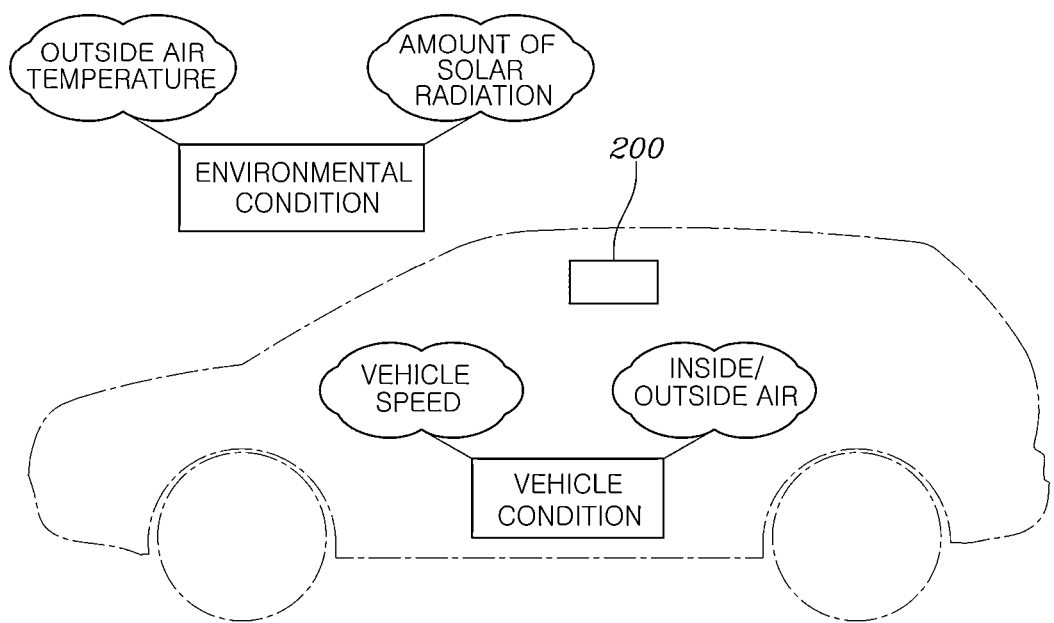
FIG. 2 is a view illustrating environment information collected by a collection part of the heating, ventilation, and air-conditioning device for a vehicle according to the embodiment of the present disclosure.
Figure 3:
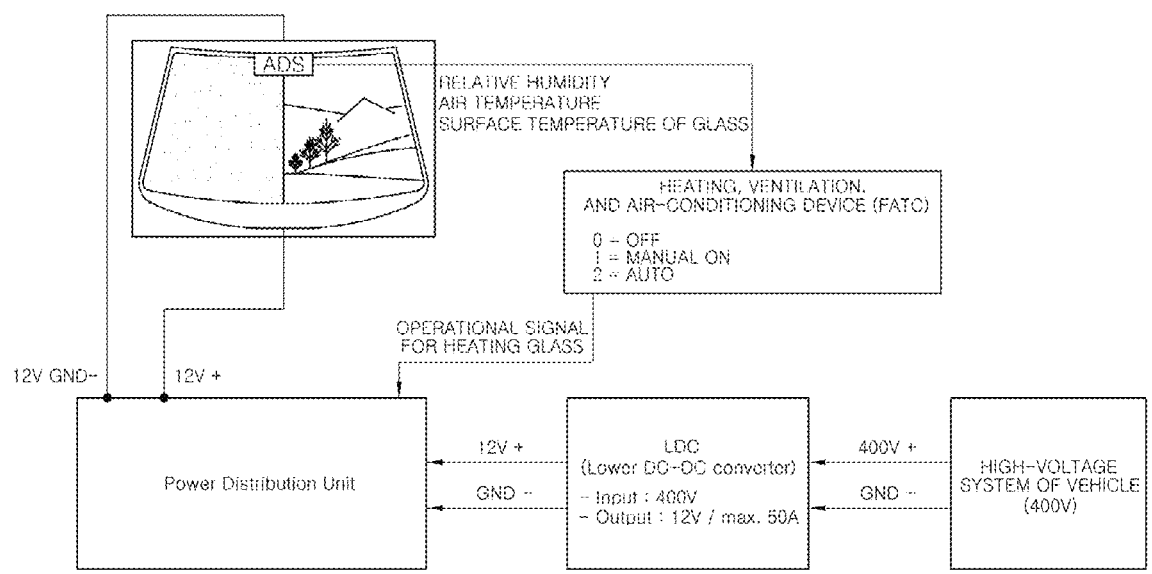
FIG. 3 is an operation circuit diagram of a heating part of the heating, ventilation, and air-conditioning device for a vehicle according to the embodiment of the present disclosure.

FIG. 1 is a view schematically illustrating a heating, ventilation, and air-conditioning device for a vehicle according to an embodiment of the present disclosure. FIG. 2 is a view illustrating environment information collected by a collection part of the heating, ventilation, and air-conditioning device for a vehicle according to the embodiment of the present disclosure. FIG. 3 is an operation circuit diagram of a heating part of the heating, ventilation, and air-conditioning device for a vehicle according to the embodiment of the present disclosure.

A control unit 300 according to an embodiment of the present disclosure may be implemented by a non-volatile memory (400) configured with an algorithm for controlling operations of various constituent elements in a vehicle or to store data related to software commands for executing the algorithm, and by a processor (400) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

FIG. 1 is a view schematically illustrating a heating, ventilation, and air-conditioning device for a vehicle according to an embodiment of the present disclosure. FIG. 3 is an operation circuit diagram of a heating part of the heating, ventilation, and air-conditioning device for a vehicle according to the embodiment of the present disclosure. The heating, ventilation, and air-conditioning device for a vehicle according to the embodiment of the present disclosure includes: a heating part 100 disposed in a windshield glass of a vehicle and configured to heat the windshield glass; a collection part 200 configured to collect state information on a state of the windshield glass and environment information on internal and external environments of the vehicle; and a control part 300. The control part 300 is configured to determine a defrosting or dehumidifying mode for the windshield glass based on the state information or the environment information collected by the collection part 200 and to control an operation of the heating part 100 depending on the determined defrosting or dehumidifying mode.

In addition, the heating, ventilation, and air-conditioning device for a vehicle according to the embodiment of the present disclosure may further include a cooling/heating unit (400) configured to cool and heat an interior of the vehicle or the windshield glass. The control part 300 may control the operation of the heating part 100 and the operation of the cooling/heating unit depending on the determined defrosting or dehumidifying mode.

Specifically, in the related art, a user in a vehicle pushes a defrosting (DEF) button (air conditioning function) or a heating wire button (heating wire function) to remove frost or moisture from a windshield glass of the vehicle. In contrast, the heating, ventilation, and air-conditioning device for a vehicle according to the embodiment of the present disclosure may monitor the state of the windshield glass or the internal and external environments of the vehicle using the collection part 200, determine whether frost or moisture forms on the windshield glass based on the monitoring result, and perform the defrosting mode and the dehumidifying mode, thereby more efficiently removing frost or moisture from the windshield glass.

Further, the heating, ventilation, and air-conditioning device for a vehicle according to the embodiment of the present disclosure may quickly remove frost or moisture from the windshield glass and ensure maximum energy efficiency by controlling the heating part 100 embedded in the windshield glass and controlling the cooling/heating unit of the vehicle, i.e., the heating, ventilation, and air-conditioning (HVAC) device.

FIG. 2 is a view illustrating environment information collected by the collection part of the heating, ventilation, and air-conditioning device for a vehicle according to the embodiment of the present disclosure. In the heating, ventilation, and air-conditioning device for a vehicle according to the embodiment of the present disclosure, the state information may include a temperature or transparency of the windshield glass, the environment information may include temperatures or relative humidity inside and outside the vehicle, a vehicle speed, or the amount of solar radiation. Additionally, the collection part 200 may collect the state information or the environment information using a sensor unit, which may include a temperature sensor, a humidity sensor, a laser sensor, or a camera sensor.

In addition, when the control part 300 of the heating, ventilation, and air-conditioning device for a vehicle according to the embodiment of the present disclosure receives a manual heating operation for the windshield glass from a user, the control part 300 may determine whether frost or moisture forms on the windshield glass depending on an outside temperature of the vehicle or a vehicle speed. Further, the control part 300 may determine the defrosting or dehumidifying mode based on the result of determining whether frost or moisture is present.

Meanwhile, when the control part 300 of the heating, ventilation, and air-conditioning device for a vehicle according to the embodiment of the present disclosure receives the manual heating operation, the control part 300 may determine that frost forms on the windshield glass when an outside temperature of the vehicle is lower than a predetermined temperature and the vehicle speed is 0 km/hr after the vehicle is started. The control part 300 may then determine the defrosting mode for removing frost.

In addition, when the control part 300 of the heating, ventilation, and air-conditioning device for a vehicle according to the embodiment of the present disclosure receives the manual heating operation, the control part 300 may determine that moisture forms on the windshield glass when an outside temperature of the vehicle is equal to or higher than the predetermined temperature. Alternatively, the control part 300 may determine that moisture forms on the windshield glass when the vehicle speed has exceeded 0 km/hr, i.e., when the vehicle is moving, after the vehicle is started. The control part 300 may then determine the dehumidifying mode for removing moisture.

Specifically, when the control part 300 of the heating, ventilation, and air-conditioning device for a vehicle according to the embodiment of the present disclosure receives the manual heating operation for the windshield glass, the control part 300 may operate the heating part 100 at a maximum temperature for a predetermined time when the defrosting mode for removing frost from the windshield glass is determined. The control part 300 may operate the heating part 100, when the dehumidifying mode for removing moisture from the windshield glass is determined, until a temperature of the windshield glass reaches a predetermined temperature.

In other words, during the manual heating operation, the control part 300 may consistently maintain the maximum temperature of the heating part 100 when the control part 300 determines the defrosting condition of the windshield glass in the winter season (to ensure defrosting performance). Further, when the control part 300 determines that a current condition is a dehumidifying condition in which moisture forms in the interior of the vehicle during a traveling condition, the control part 300 turns off the heating part 100 to minimize power consumption when the temperature of the heating part 100 reaches a particular temperature (e.g., about 35° C.). In other words, since the manual DEF is selected, the control part 300 turns off the heating part 100 when the temperature of the heating part 100 reaches the particular temperature (e.g., about 35° C.) because a customer can at least think or understand that the heating, ventilation, and air-conditioning device operates without failure when the customer feels warmth or heat at the time of touching the windshield with his/her hand.

Meanwhile, when the manual heating operation is performed by the user, the front visual field needs to be ensured in the defrosting mode to allow the vehicle to travel. Therefore, the control part 100 may operate the defrosting mode under a condition in which the vehicle speed is continuously maintained at 0 km/h after the vehicle is started. When the vehicle is stationary while waiting at traffic lights after traveling, the defrosting is not required or desired because the vehicle may travel even though the vehicle speed is 0 km/h. Therefore, the control part 100 does not operate the defrosting mode when the condition of vehicle speed>0 km/h is input once or more times. In this case, a maximum operating time of the heating part 100 before the vehicle travels may be set to 'A' minutes (e.g., about 15 to 20 minutes). In addition, when the manual heating operation is performed by the user, the operating temperature of the heating part 100 may be set to about 30 to 35° C., in one example, in the dehumidifying mode.

Meanwhile, when an automatic heating operation is performed on the windshield glass while the vehicle travels, the control part 300 of the heating, ventilation, and air-conditioning device for a vehicle according to the embodiment of the present disclosure may determine whether frost or moisture forms on the windshield glass by comparing relative humidity in the vehicle with reference humidity or by comparing a temperature of the windshield glass with a dew point temperature. The control part 300 may then determine the defrosting or dehumidifying mode based on the result of determining whether the frost or moisture is present.

In addition, in the heating, ventilation, and air-conditioning device for a vehicle according to the embodiment of the present disclosure, the reference humidity may be humidity at which moisture forms on the windshield glass of the vehicle. The reference humidity may be determined based on an outside temperature of the vehicle, a vehicle speed, the amount of solar radiation, or an inside/outside air mode of the vehicle.

Specifically, when the automatic heating operation is performed on the windshield glass by the heating, ventilation, and air-conditioning device for a vehicle according to the embodiment of the present disclosure, the control part 300 may operate the heating part 100. More specifically, the control part 300 may operate the heating part 100 until the relative humidity in the vehicle becomes equal to or lower than the reference humidity when the dehumidifying mode for removing moisture from the windshield glass is determined.

In this case, the reference humidity decreases as an outside air temperature decreases, the vehicle speed increases, and the amount of outside solar radiation is not present or decreases. Further, the reference humidity decreases when a recirculation mode is performed in accordance with the inside/outside air mode of the vehicle.

In addition, when the automatic heating operation is performed on the windshield glass by the heating, ventilation, and air-conditioning device for a vehicle according to the embodiment of the present disclosure, the control part 300 may operate the heating part 100. More specifically, the control part 300 may operate the heating part 100 until the temperature of the windshield glass becomes higher, by a predetermined numerical value or more, than the dew point temperature when the dehumidifying mode for removing the moisture from the windshield glass is determined.

In other words, during the automatic heating operation (auto defog system (ADS)), the control part 300 detects a surface temperature of the windshield glass, an air temperature around the windshield glass, and relative humidity of the air around the windshield glass and sends the detection result to the heating, ventilation, and air-conditioning device (FATC). Then, the heating, ventilation, and air-conditioning device calculates a dew point temperature of the windshield glass and operates the heating part 100 when a difference between the current surface temperature of the windshield glass and the dew point temperature becomes within a reference temperature (e.g., about 2° C.). The heating, ventilation, and air-conditioning device turns off the heating part 100 after raising the surface temperature of the windshield glass to a target temperature (e.g., about 5° C.), thereby minimizing the consumption of power for operating the heating part 100.

Meanwhile, during the automatic heating operation, the control part 300 does not calculate the dew point temperature but uses the relative humidity of the air around the windshield. When the humidity reaches a high threshold or target humidity (e.g., about 80%), the control part 300 may control the temperature of the heating part 100 and may turn off the heating part 100 when the humidity reaches the low threshold or target humidity (e.g., about 50%). At the time of using the relative humidity, when the detected relative humidity of the air is equal to or higher than the upper or high threshold target humidity, i.e., 80%, for example, the control part 300 determines that moisture forms on the windshield glass of the vehicle, and the control part 300 operates the heating part 100. When the relative humidity decreases to the lower or low threshold or target humidity, i.e., 50% or less, for example, after the heating part 100 operates, the control part 300 stops the operation of the heating part 100, thereby removing the moisture formed on the windshield glass of the vehicle.

While the specific embodiments of the present disclosure have been illustrated and described, it should be apparent to those having ordinary skill in the art that the present disclosure may be variously modified and changed without departing from the technical spirit of the present disclosure defined in the appended claims.

DESCRIPTION OF REFERENCE NUMERALS

100: Heating part
200: Collection part
300: Control part

What is claimed is:

1. A heating, ventilation, and air-conditioning device for a vehicle, the device comprising:
   a heating part disposed in a windshield glass of a vehicle and configured to heat the windshield glass;
   a collection part configured to collect state information on a state of the windshield glass or environment information on internal and external environments of the vehicle; and
   a control part configured to determine a defrosting or dehumidifying mode for the windshield glass based on the state information or the environment information collected by the collection part and control an operation of the heating part depending on the determined defrosting or dehumidifying mode,
   wherein the control part operates the heating part at a maximum temperature for a predetermined time when the defrosting mode for removing frost from the windshield glass is determined,
   wherein the control part operates the heating part, when the dehumidifying mode for removing moisture from the windshield glass is determined, until a temperature of the windshield glass reaches a predetermined temperature,
   wherein the control part determines that frost forms on the windshield glass when the outside temperature of the vehicle is lower than a predetermined temperature and when the vehicle speed is 0 km/h after the vehicle is started, and wherein the control part determines the defrosting mode for removing frost,
   wherein the control part determines that moisture forms on the windshield glass when the outside temperature of the vehicle is equal to or higher than a predetermined temperature or when the vehicle speed has exceeded 0 km/h after the vehicle is started, and wherein the control part determines the dehumidifying mode for removing moisture, and
   wherein, when an automatic heating operation is performed on the windshield glass while the vehicle travels, the control part determines whether frost or moisture forms on the windshield glass by comparing a relative humidity in the vehicle with a reference humidity or by comparing a temperature of the windshield glass with a dew point temperature, and wherein the control part determines the defrosting or dehumidifying mode based on the result of determining whether the frost or moisture forms on the windshield glass.

2. The device of claim 1, further comprising:
   a cooling/heating unit configured to cool and heat an interior of the vehicle or the windshield glass,
   wherein the control part controls the operation of the heating part and the operation of the cooling/heating unit depending on the determined defrosting or dehumidifying mode.

3. The device of claim 1, wherein the state information comprises a temperature or transparency of the windshield glass, wherein the environment information comprises temperatures or relative humidity inside and outside the vehicle, a vehicle speed, or the amount of solar radiation, and wherein the collection part collects the state information or the environment information using a sensor unit, which comprises a temperature sensor, a humidity sensor, a laser sensor, or a camera sensor.

4. The device of claim 3, wherein, when the control part receives a manual heating operation for the windshield glass from a user, the control part determines whether frost or moisture forms on the windshield glass depending on the outside temperature of the vehicle or the vehicle speed and determines the defrosting or dehumidifying mode based on the result of determining whether frost or moisture forms on the windshield glass.

5. The device of claim 1, wherein the reference humidity is a humidity at which moisture forms on the windshield glass of the vehicle, and wherein the reference humidity is determined based on the outside temperature of the vehicle, the vehicle speed, the amount of solar radiation, or an inside/outside air mode of the vehicle.

6. The device of claim 1, wherein, when the automatic heating operation is performed on the windshield glass, the control part operates the heating part until the relative humidity in the vehicle becomes equal to or lower than the reference humidity when the dehumidifying mode for removing moisture from the windshield glass is determined.

7. The device of claim 1, wherein, when the automatic heating operation is performed on the windshield glass, the control part operates the heating part until the temperature of the windshield glass becomes higher, by a predetermined numerical value or more, than the dew point temperature when the dehumidifying mode for removing moisture from the windshield glass is determined.

* * * * *